(12) United States Patent
Lee et al.

(10) Patent No.: US 11,536,462 B2
(45) Date of Patent: Dec. 27, 2022

(54) OVEN

(71) Applicant: LG ELECTRONICS INC., Seoul (KR)

(72) Inventors: Dae Yong Lee, Seoul (KR); Chung Kang, Seoul (KR); Euisu Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 693 days.

(21) Appl. No.: 16/521,649

(22) Filed: Jul. 25, 2019

(65) Prior Publication Data
US 2020/0033009 A1 Jan. 30, 2020

(30) Foreign Application Priority Data

Jul. 26, 2018 (KR) .......................... 10-2018-0087430

(51) Int. Cl.
*F24C 15/08* (2006.01)
*F24C 15/02* (2006.01)
(Continued)

(52) U.S. Cl.
CPC .............. *F24C 15/08* (2013.01); *A47J 27/12* (2013.01); *A47J 36/34* (2013.01); *A47J 37/0623* (2013.01);
(Continued)

(58) Field of Classification Search
CPC . F24C 15/08; F24C 15/02; A47J 27/12; A47J 37/0641; A47J 37/01; A47J 37/0623;
(Continued)

(56) References Cited

U.S. PATENT DOCUMENTS 1,756,179 A * 4/1930 Busiek .................. F24C 15/023
126/190
2,335,279 A * 11/1943 Hobson .................. F24C 15/08
126/39 B
(Continued)

FOREIGN PATENT DOCUMENTS

CA         2840572 C  *  9/2020  ............. F24C 15/08
CN    108344018 A  *  7/2018  .......... A47J 37/0664
(Continued)

OTHER PUBLICATIONS

Korean Office Action dated Aug. 6, 2020 issued in KR Application No. 10-2018-0087430.
(Continued)

*Primary Examiner* — Steven B McAllister
*Assistant Examiner* — Daniel E. Namay
(74) *Attorney, Agent, or Firm* — Ked & Associates, LLP

(57) ABSTRACT

A stacked oven may include a supporter installed between a first oven at a lower portion of the first oven and a second oven above the first oven and fixing the second oven at a position spaced apart upward from the first oven. The supporter may include a first installation member that includes a vertical extending member that contacts a side surface of the first oven, a lateral extending member that extends from an upper portion of the vertical extending member in a direction toward a center of the first oven, and a load support provided between a lower portion of the lateral extending member and the first oven; a second installation member that includes a lower surface support and a side surface support that contact a lower surface and a side surface of the second oven, respectively, and having an angle with respect to each other, and a guide that extends upward and outward from an upper end of the side surface
(Continued)

support; and a connection member that vertically connects the lateral extending member and the lower surface support.

19 Claims, 10 Drawing Sheets

(51) Int. Cl.
    *A47J 37/06* (2006.01)
    *A47J 27/12* (2006.01)
    *A47J 36/34* (2006.01)
    *F16B 5/02* (2006.01)
    *F16B 5/12* (2006.01)
    *A47J 37/01* (2006.01)

(52) U.S. Cl.
    CPC ........... *A47J 37/0641* (2013.01); *F16B 5/025* (2013.01); *F16B 5/128* (2013.01); *F24C 15/02* (2013.01); *A47J 37/01* (2013.01)

(58) Field of Classification Search
    CPC ........... A47J 36/34; F23C 15/30; F16B 5/025; F16B 5/128
    USPC .......... 126/19 R, 9 B; 16/404; 248/126, 201, 248/214, 219.1
    See application file for complete search history.

(56) References Cited

U.S. PATENT DOCUMENTS

| | | | | | |
|---|---|---|---|---|---|
| 2,775,237 | A | * | 12/1956 | Chadwick | F24C 15/08 126/39 C |
| 3,478,997 | A | * | 11/1969 | Goss | A47G 1/215 52/766 |
| 4,580,853 | A | * | 4/1986 | Hitzeroth | A47B 77/02 248/327 |
| 8,569,661 | B2 | | 10/2013 | Kemper et al. | |
| 8,584,663 | B2 | | 11/2013 | Kim et al. | |
| 9,182,132 | B2 | * | 11/2015 | Penuel | F24C 15/08 |
| 9,228,748 | B2 | | 1/2016 | Nelson et al. | |
| 10,024,541 | B2 | * | 7/2018 | Wojick | H05B 6/642 |
| 2007/0175885 | A1 | * | 8/2007 | Brower | F24C 15/08 219/401 |
| 2008/0308709 | A1 | | 12/2008 | Tartan et al. | |
| 2015/0022068 | A1 | | 1/2015 | Kemper | |
| 2015/0027429 | A1 | * | 1/2015 | Nelson | F24C 15/023 126/194 |
| 2015/0042221 | A1 | | 2/2015 | Penuel | |
| 2017/0328573 | A1 | | 11/2017 | Wojick et al. | |

FOREIGN PATENT DOCUMENTS

| | | | | |
|---|---|---|---|---|
| EP | 2581667 | | 4/2013 | |
| EP | 2 798 277 | | 11/2014 | |
| GB | 2 197 457 | | 5/1988 | |
| JP | H06-069604 | | 9/1994 | |
| KR | 10-2005-0008087 | | 1/2005 | |
| KR | 20050008087 A | * | 1/2005 | .............. F24C 11/00 |
| KR | 10-2018-28691 | | 3/2018 | |
| KR | 10-1859320 | | 5/2018 | |
| KR | 10-2018-80062 | | 7/2018 | |
| WO | WO-2010034833 A1 | * | 4/2010 | .............. F24C 15/08 |

OTHER PUBLICATIONS

European Office Action dated Sep. 28, 2020 issued in EP Application No. 19188528.4.
Korean Notice of Allowance dated Feb. 23, 2021 issued in Application No. 10-2018-0087430.
European Search Report dated Dec. 5, 2019.

* cited by examiner

OVEN

CROSS-REFERENCE TO RELATED APPLICATION(S)

This application claims priority to and the benefit of Korean Patent Application No. 10-2018-0087430, filed in Korea on Jul. 26, 2018, the disclosure of that is incorporated herein by reference in its entirety.

BACKGROUND

1. Field

A structure of a two-stage stacked oven is disclosed herein.

2. Background

Cooking appliances that have a cooking chamber, such as microwave ovens or ovens, have a substantially rectangular parallelepiped appearance, and have a cooking chamber in the cooking appliance opened to the front, and including a door at a front of the cooking chamber.

There are various ways of opening the oven door, but a method in which a door using a hinge rotated about a rotary shaft to be opened and closed is widely used. The door using a method of rotating and opening is classified into a swing door that has a hinge as a vertical axis and a pull-down door that has a hinge as a horizontal axis.

Recently, in order to use an indoor space more efficiently and to enhance an effect of decorating the indoor, cooking appliances are used in which ovens using different cooking methods are stacked with two stages. These two-stage stacked ovens are also used in a built-in manner.

Generally, a manufacturer of the cooking appliance usually produces and commercializes respective ovens that use different cooking methods from each other. To the contrary, as disclosed in KR Patent Laid-Open Publication No. 10-2018-28691 and KR Patent Laid-Open Publication No. 10-2018-80062, which are hereby incorporated by reference and referred to respectively as Patent Documents 1 and 2, when a two-stage stacked oven is manufactured, an oven different from the above respective ovens are designed and manufactured, and commercialized. However, there is a difficulty in that a production line is additionally constructed and parts may not be shared.

Further, the built-in type oven stacked with two stages causes a problem that has not occurred in the respective ovens in the related art. For example, electric parts or components of the oven or a tank that stores water to supply steam into the oven is generally provided in an upper space of a cavity of the oven. However, when a two-stage stacked oven is provided by installing an oven that uses a different cooking method on the above oven, a dimension of an overall height of the two ovens is limited, while a greater space of each cooking chamber of the two ovens may be provided.

As a result, the height of the space that may be occupied by electric parts and water tanks installed between the two vertical ovens may be reduced. However, as a temperature of the cooking chamber of the oven installed in the lower portion is increased to a considerably high temperature, there may be a problem in cooling of the electric parts or the water tank, which are made of synthetic resin installed in a narrow space and vulnerable to heat. However, the two-stage stacked oven disclosed in Patent Documents 1 and 2 has no solution to this problem.

Next, when the door is closed, the pull-down door requires an additional space at the lower portion thereof to open the door. Therefore, an additional space to open the door of the oven installed at the upper portion thereof may be provided.

BRIEF DESCRIPTION OF THE DRAWINGS

Embodiments will be described in detail with reference to the following drawings in which like reference numerals refer to like elements, and wherein.

DETAILED DESCRIPTION

Figure 1:
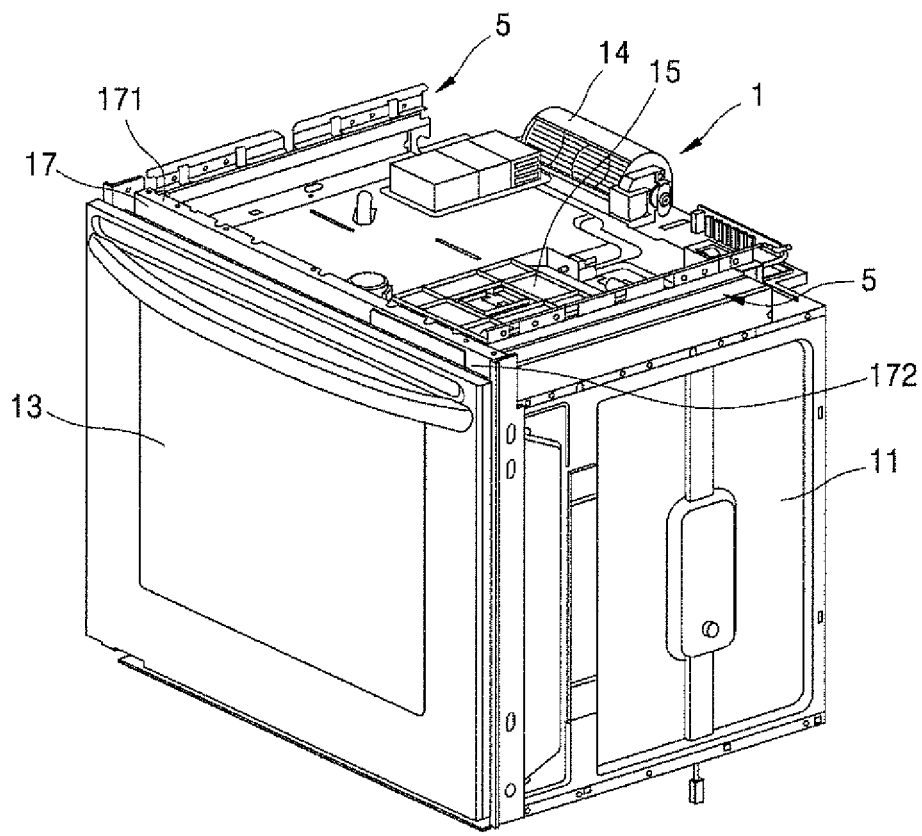
FIG. 1 is a perspective view of an embodiment of a first oven installed at a lower portion of an oven according to an embodiment.
Figure 2:
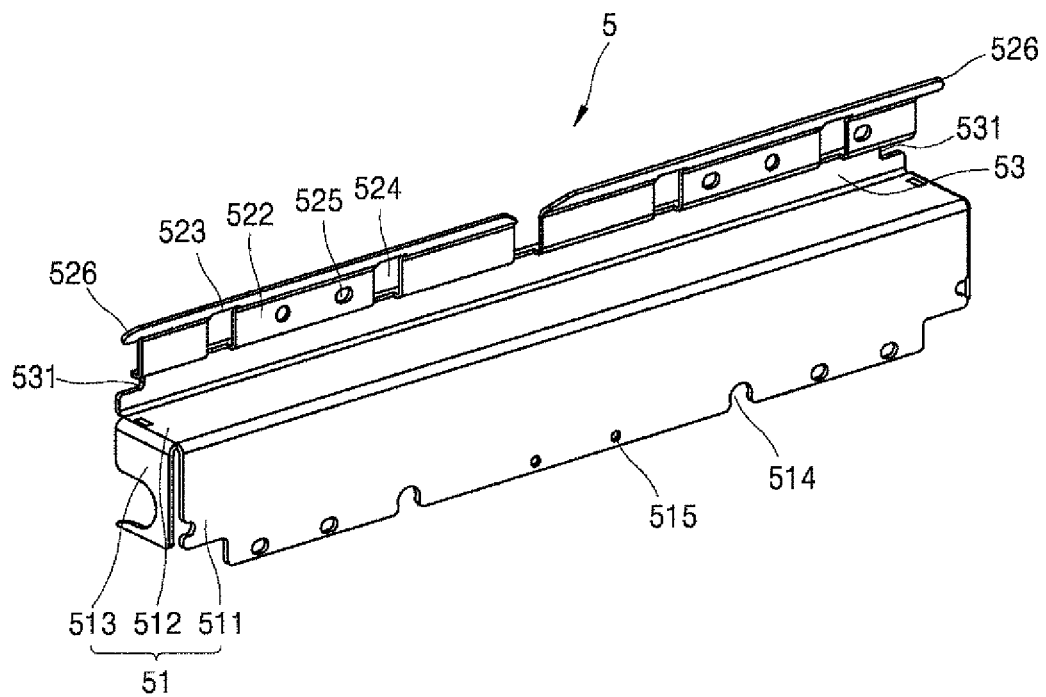
FIGS. 2 and 3 are perspective views of supporters installed between a first oven and a second oven from outside and inside, respectively.

Hereinafter, embodiments be described in detail with reference to the accompanying drawings. Wherever possible, the same or like reference numerals have been used to indicate the same or like elements, and repetitive disclosure has been omitted. Embodiments are not limited to the embodiments described below, but may be implemented in various different manners from each other, and these embodiments are provided so that this disclosure will be thorough and complete, and to fully convey the scope of the disclosure to those skilled in the art.

Hereinafter, an overall structure of an oven according to an embodiment will be described.

According to embodiments, the oven has a structure in that a first oven 1 and a second oven 2 are vertically stacked with two layers wherein the first oven 1 and a second oven 2 use different heating methods from each other.

Examples of a first oven 1 may include a gas burner, a broil burner, an electric heating burner, or a burner using a combination thereof. A first cooking chamber 12 is provided in the first oven 1 and the first cooking chamber 12 is opened to the front. Accordingly, a first housing 11 that defines an overall appearance of the first oven 1 includes a hollow rectangular parallelepiped shape opened to the front.

A first door 13 that rotates about a horizontal axis provided at a lower end thereof and is opened and closed is installed at the front of the first oven 1. The first door 13 includes a transparent window through which the inside of first cooking chamber 12 may be visible from outside. There may be a double glass of window installed in the first door 13 having distance therebetween. A handle that may be used for pulling and opening the first door 13 may be provided at the upper portion of the first door 13.

A predetermined space is provided inside of the first door 13. A first air flow hole (not shown) through which air may flow is provided in the vicinity of the lower surface of the first door 13. The first air flow hole is provided at the lower surface of the first door 13 and is not visible to the user. Likewise, a second air flow hole (not shown) is provided at the upper portion of the rear surface of the first door 13. As the second air flow hole is also provided on the rear surface of the first door, the second air flow hole is not visible to the user when the first door 13 is in a closed state.

A finishing panel 17 that faces the rear surface of the first door 13 is provided at the front of the first housing 11. The finishing panel 17 is a circumference part of an opening of the first cooking chamber 12 which is visible to the user when a user opens the first door 13. Thus, the finishing panel 17 may be enameled to enhance aesthetic quality.

A predetermined space is provided above the first housing 11, and a water tank housing 15 that stores water for steam to be supplied into the first cooking chamber 12 and a circuit substrate (not shown) on which electric parts that control the first oven 1 are mounted are installed in this space.

The second oven 2 is disposed above a predetermined space provided above the first housing 11 by a supporter 5 which is described hereinafter. The supporter 5 (also referred to as a "bracket") may be provided as a pair. The pair of supporters (brackets) 5 may be disposed at lateral sides of the first oven 1 and second oven 2.

The second oven 2 defines an upper limit of the upper space of the first housing 11. The finishing panel 17 protrudes and extends upward from the upper surface of the first housing 11 at the front of the first housing 11 to cover the front of the upper space of the first housing 11.

As the outer end of the finishing panel 17 includes rearward bending portion 171 bent to extend rearward, an edge of the panel may be invisible from outside. Further, an opening 172 is provided on a right side of the upper portion of the finishing panel 17 to allow the water tank to be inserted into or to be withdrawn from a water tank housing 15. An upper through-hole 111 that communicates with the front space of the oven and the upper space of the first housing 11 partitioned by the finishing panel 17 is provided on a left side of the upper portion of the finishing panel 17. The upper through-hole 111 of the finishing panel 17 faces and communicates with the second airflow hole (not shown) provided at an upper portion of a rear side of the first door 13 when the first door 13 is closed.

A turbo fan 14 is installed rearward of an upper space of the first housing 11. The turbo fan 14 suctions air at a front of the upper space of the first housing 11 and discharges the air to a rear space of the first cooking chamber 12 in the first housing 11. A lower through-hole 113 that communicates with the rear space of the first cooking chamber 12 and is opened to the front is provided in the front lower portion of the first housing 11.

Accordingly, when the turbo fan 14 is operated, the external air in the front lower portion of the first oven is introduced into the first door through the first airflow hole provided at the lower portion of the first door 13 and rises. In this process, heat transferred from the first cooking chamber 12 to the first door 13 is cooled.

The air that has risen from the inside of the first door 13 is introduced into the upper space of the first housing 11 through the second air flow hole and the upper through-hole 111 and is suctioned into the turbo fan 14. In this process, electrical parts or components, for example, in the upper space of the first housing 11 may be cooled. However, when the upper space of the first housing 11 is narrowed by installing the second oven 2, the electric parts or the water tank and the water tank housing 15 disposed above the first housing 11 may not be smoothly cooled only by the air a temperature of which is increased.

The air discharged downward by the turbo fan 14 flows along the spaces provided in the rear and lower portions of the first cooking chamber 12 in the first housing 11 and is discharged back to the front lower portion of the first oven through the lower through-hole 113.

Example of a second oven 2 may include a microwave oven, but is not limited thereto. A second cooking chamber 22 is provided in the second oven 2, and the second cooking chamber 22 is also opened to the front. Thus, a user may access both the first and second cooking chambers at a front of a two-stage stacked oven. The second housing 21 that defines an overall appearance of the second oven 2 includes a rectangular parallelepiped shape that is opened to the front.

In the embodiment, a first oven is a heating type burner and a second oven is a microwave burner. However, embodiments are not limited thereto.

A second oven door 23 that is opened and closed to be rotatable about a horizontal axis provided at a lower end thereof is installed at a front of the second oven 2. The second door 23 is provided in front of the second oven 2 to be rotatably opened with respect to a horizontal axis of a lower end of the second door. A transparent window through which the second cooking chamber 22 is visible from the outside thereof is installed at the second door 23. In the microwave type oven, a temperature of an inside of the second cooking chamber 22 does not significantly rise compared to a first cooking chamber 12. Thus, there is less need to flow the cooling air into the inside thereof, unlike the first door 13.

According to the embodiment, the first door and the second door have a structure in which both are opened and closed in a pull-down manner, but the method of opening the door is not necessarily limited thereto. For example, the second door and/or the first door may have a structure in which the second door and/or the first door are opened in a swing manner.

A second front member 27 that faces the rear surface of the second door 23 is installed at the front of second housing 21. An upper through-hole 211 is provided in a region of the second front member 27 located above the front opening of the second cooking chamber 22. A lower through-hole 213 is provided in a region of the second front member 27 located below the front opening of the second cooking chamber 22. The upper through-hole 211 allows the upper space of the second cooking chamber 22 in the second housing 21 and the space outside of the front of the second oven 2 to communicate with each other. The lower through-hole 213 allows the lower space of the second cooking chamber 22 in the second housing 21 to communicate with the space outside of the front of the second oven 2.

Even when the second door 23 is closed, the upper through-hole 211 and the lower through-hole 213 are not blocked by the second door 23 and communicate with an external space. That is, the rear surface of the second door 23 does not cover the upper through-hole 211 and the lower through-hole 213, and the front surface of the second door 23 covers the upper through-hole 211 and the lower through-hole 213 and enables the upper through-hole 211 and the lower through-hole 213 not to be visible from a view of a person located at the front of the second oven 2.

Electric parts, such as a magnetron, are provided in an upper space of the second cooking chamber 22, in the second housing 21. Further, the turbo fan 24 is provided in the upper space of the second housing 21. The turbo fan 24 suctions the air at the front thereof and discharges the air rearward.

When the turbo fan 24 is operated, the air outside of the second oven 2 is introduced into the upper space of the second cooking chamber 22 through the upper through-hole 211 and is suctioned into the turbo fan 24 and is discharged rearward. The discharged air is discharged back to the outside of the second oven 2, through the lower through-hole 213 via the rear space and the lower space of the second cooking chamber 22. Thus, the second cooking chamber 22 and the electrical parts provided in a space above the second cooking chamber 22 are cooled.

The upper portion and the lower portion of the second front member 27 do not protrude further outward than the upper surface and the lower surface of the second housing 21 with respect to the opening of the second cooking chamber 22, and cover the space between the second housing 21 and the second cooking chamber 22 from the front. On the other hand, both sides of the second front member 27 protrude outward more laterally than the side surface of the second housing 21 with respect to the opening of the second cooking chamber 22. The rear surface of the second front member 27 protruding laterally outward from the side surface of the second housing 21 is a standard for restricting an installation position of the second oven 2 in a forward and rearward direction thereof described below.

The lower surface of the second housing 21 of the second oven 2 is spaced apart from the upper surface of the first housing 11 of the first oven 1 when the second oven 2 is installed above the first oven 1.

The supporter 5 is installed between the first oven 1 and the second oven 2 to fix the second oven 2 at a position spaced upward from the first oven 1. The supporter 5 connects sides of the first oven 1 and the second oven 2 to each other and mutually fixes and aligns the sides of the first oven 1 and the second oven 2.

Hereinafter, a structure of a supporter and a coupling structure of a supporter, a first oven, and a second oven are described.

The supporter 5 includes a first installation member 51 that is fastened to the first oven 1, a second installation member 52 that is fastened to the second oven 2, and a connection member 53 that connects the first installation member and the second connection member. The supporter 5 may be manufactured by bending a metal plate that has a thickness of about 1.6 mm, for example.

The first installation member 51 contacts an upper portion of a side surface and an upper surface of first housing 11 of first oven 1 in a substantially "]" shape (L-shape) and is fixed to the first housing. The first installation member 51 includes a vertical extending member 511 that contacts a side surface of the first housing 11 and vertically extends, a lateral extending member 512 that extends from an upper portion of the vertical extending member 511 in a second lateral direction (a direction deeper into or toward a center of an oven), and a load supporting member or support 513 that is disposed between the lateral extending member 512 and the first housing 11.

The vertical extending member 511 has a flat plate shape extending in a vertical direction and a forward and rearward direction to contact the side surface of the first housing. The vertical extending member 511 extends longer in the forward and rearward direction than the vertical direction thereof.

The vertical extending member 511 includes a plurality of installation holes 515 along the forward and rearward direction at predetermined intervals. Further, an avoiding hole 514 that has a concavely recessed shape upward from an edge thereof is provided at a lower end of the vertical extending member 511. The avoiding hole 514 avoids a portion protruding from the side surface of the first housing 11 when the vertical extending member 511 is installed at the side surface of the first housing 11. Therefore, it is possible to accurately restrict the installation position of the vertical extending member 511 with respect to the side surface of the first housing 11 from the avoiding hole 514. The supporter fastening member 54 is fastened to the side surface of the first housing through the installation hole 515 to firmly fix the supporter 5 to the first housing.

According to embodiments, as the supporter 5 is installed on the right and left or lateral sides of the first oven, it is not necessary to distinguish the supporter installed on the left side from the supporter installed on the right side. The avoiding hole 514 and the installation hole 515 are provided symmetrically at corresponding positions in the forward and rearward direction thereof based on a center point of a length in the forward and rearward direction, thereby reducing a number of components and decreasing inconvenience of assembly.

The lateral extending member 512 is bent from the upper end of the vertical extending member 511 and horizontally extends. The lateral extending member 512 has a flat plate shape extending in the lateral direction and the forward and rearward direction thereof. The lateral extending member 512 extends longer in the forward and rearward direction thereof than in the lateral direction thereof.

According to embodiments, the oven 1 supports the second oven 2 with two supporters 5 on both right and left sides of the first oven. Therefore, the supporter 5 may have rigidity strong enough to support the second oven 2. In order to sufficiently provide the rigidity of the supporter made of a metal plate, a thick metal plate of about 1.6 to 2 mm is used as the metal plate.

When the metal plate that has the above-described thickness is bent, the bending portion is bent into a round shape that has a certain radius. On the other hand, an edge at which the side surface and the upper surface of the first housing 11 meet is significantly sharply angled compared to the bending portion of the supporter. Therefore, when the vertical extending member 511 contacts the side surface of the first housing 11 and the lateral extending member 512 contacts the upper surface of the first housing 11 and the vertical extending member 511 and the lateral extending member 512 are fastened to each other, it is difficult to accurately restrict a fastening position of the supporter with respect to the first housing.

According to embodiments, the lateral extending member 512 is spaced apart from the upper surface of the first housing 11 by a predetermined distance, and the load supporting member 513 is disposed at a lower portion of the lateral extending member 512 and in a lateral direction of the vertical extending member 511. The load supporting member 513 is disposed between the lateral extending member 512 and the upper surface of the first housing 11. The load supporting member 513 is bent downward from the lateral extending member 512 and extends downward to contact the upper surface of the first housing 11. Accordingly, the lateral extending member 512 may be installed at a position corresponding to a predetermined height from the upper surface of the first oven by the load supporting member. A curved bending portion between the lateral extending member 512 and the vertical extending member 511 is slightly spaced apart upward from the edge at the upper end of the side surface of the first housing 11.

The upper end of the load supporting member 513 is connected to the lateral extending member 512 and the lower end of the load supporting member 513 contacts the upper surface of the first housing 11. The load supporting member 513 has a vertically disposed flat plate shape, and has a flat panel shape included in a plane that crosses both a plane including the vertical extending member 511 and a plane including the lateral extending member 512. Particularly, a corner in at which the lower edge of the load supporting member 513 meets with the side surface of the vertical extending member 511 may have a pointed right angle. Accordingly, the side surface of the vertical extending members 511 and the lower end of the load supporting member 513 may accurately contact the side surface and the upper surface of the first housing, respectively, and the position of the supporter 5 with respect to the first housing 11 may be accurately restricted.

A load of the lateral extending member 512 including a load of the second oven 2 seated on the supporter 5 is transmitted to the upper surface of the first housing 11 through the load supporting member 513. The load supporting member 513 may be bent downward from the front end and the rear end of the lateral extending member 512, respectively. Therefore, even when the second oven 2 is supported on the second installation member 52, sagging of the lateral extending member 512 spaced apart from the upper surface of the first oven does not occur.

When the load supporting member 513 has a structure that is bent in the second lateral direction from the vertical extending members 511, on assembly tolerance in an installation height may be accumulated by the gap existing between the load supporting member and the lateral extension when the second oven 2 is installed. Further, when the load supporting member 513 has a structure that is bent in the second lateral direction from the vertical extending member 511, there is a possibility that the corner at which the side surface of the vertical extending member 511 and the lower end of the load supporting member 513 meet may not be pointed and the side surface of the vertical extending member 511 and the lower end of the load supporting member 513 may be roundly connected, by the bending portion. This may adversely affect the alignment of the supporter 5 and the first housing 11.

The load supporting member 513 may further include a shape a portion of which is cut so that a wire or a gas pipe, for example, may pass through the load supporting member 513, as necessary, as long as there is no structural problem in the supporting of the load.

The second installation member 52 contacts a lower portion of a side surface and a lower surface of second housing 21 of second oven 2 in a substantially "]" shape (L shape) and is fixed to a second housing. The second installation member 52 includes a lower surface supporting member or support 521 that contacts the lower surface of the second housing 21 and supports the lower surface of the second housing 21, a side surface supporting member or support 522 that contacts a lower portion of a side surface of the second housing 21 and supports a side surface of the second housing 21, and a guide member or guide 523 that extends upward in a direction away from the side surface of the second housing 21 at the upper end of the side surface supporting member 522.

The lower surface supporting member 521 has a flat plate form extending in the lateral direction and the forward and rearward direction thereof to contact the lower surface of the second oven 2. The lower surface supporting member extends longer in the forward and rearward direction thereof than in the lateral direction thereof.

The side surface supporting member 522 is bent upward from the end of the first lateral direction (in a direction away from the center of the oven) of the lower surface supporting member 521 and extends upward, and the side surface supporting member 522 has an acute angle with the lower surface supporting member 521.

As described above, the supporter 5 may be manufactured by bending a metal plate that has a certain thickness to provide rigidity. The metal plate that has a considerable thickness is finished in a round shape without sharply bending the bending portion.

By bending the side surface supporting member 522 so that the side surface supporting member 522 has an acute angle with the lower surface supporting member 521, the lower surface of the second housing 21 contacts the lower surface supporting member 521 and the bending portion of the lower surface supporting member 521 and the side surface supporting member 522 do not contact a corner in which a side surface and a lower surface of the second housing 21 meet and the upper portion of the side surface supporting member 522 contacts the side surface of the second housing 21. The installation position in the lateral direction of the second oven 2 with respect to the second installation member 52 may be accurately restricted despite a presence of the rounded bending portion.

The side surface supporting member 522 has a flat plate extending in the forward and rearward direction and a slightly inclined vertical direction, and extends longer in the forward and rearward direction than the vertical direction. In addition, the guide member 523 is bent from the upper end of the side surface supporting member 522. The guide member also has a flat plate shape extending in the forward and rearward direction and the slightly inclined vertical direction, and extends longer in the forward and rearward direction than the vertical direction. The guide member is inclined in the opposite direction with respect to the side surface supporting member 522 and is inclined at a gentler or less acute angle than the side surface supporting member 522 with respect to a horizontal line.

At the side of the second housing 21, a head of a second housing fastening member 25 such as a bolt or a screw that is fastened to the side surface of the second housing during assembly of the second housing, may protrude.

An elongated hole 524 that accommodates the second housing fastening member 25 protruding laterally than the side surface of the second housing 21 is vertically formed in the side surface supporting member 522, thereby preventing the interference between the second housing fastening member or fastener 25 and the side surface supporting member 522. Accordingly, alignment in the lateral direction (the lateral direction) of the second oven 2 may be accurately performed.

The elongated hole 524 may extend further from the side surface supporting member 522 to a portion of the guide member 523 and/or a portion of the lower surface supporting member 521. This functions to reduce resistance to the bending to some extent during bending and forming of the second installation member 52 as well as resolving interference problems.

An installation hole 525 into which the supporter fastening member 54 fastened to the side surface of the second housing 21 is inserted is formed in the side surface supporting member 522. The supporter fastening member 54 may be a screw or a bolt, for example. The side surface of the second housing 21 may include a fastening hole (reference numeral is not shown) at a position corresponding to the installation hole 525.

According to embodiments, the supporter 5 is installed at both sides at the left and the right of the first oven, respectively, and it is not necessary to distinguish the supporter 5 that is installed on the right with the supporter 5 that is installed on the left. Thus, the elongated hole 524 and the installation hole 525 are provided at symmetrical positions in the forward and rearward direction based on a center of point of a length in the forward and rearward direction of the side surface supporting member 522, thereby reducing the number of components and enhancing convenience of assembly.

Figure 3:
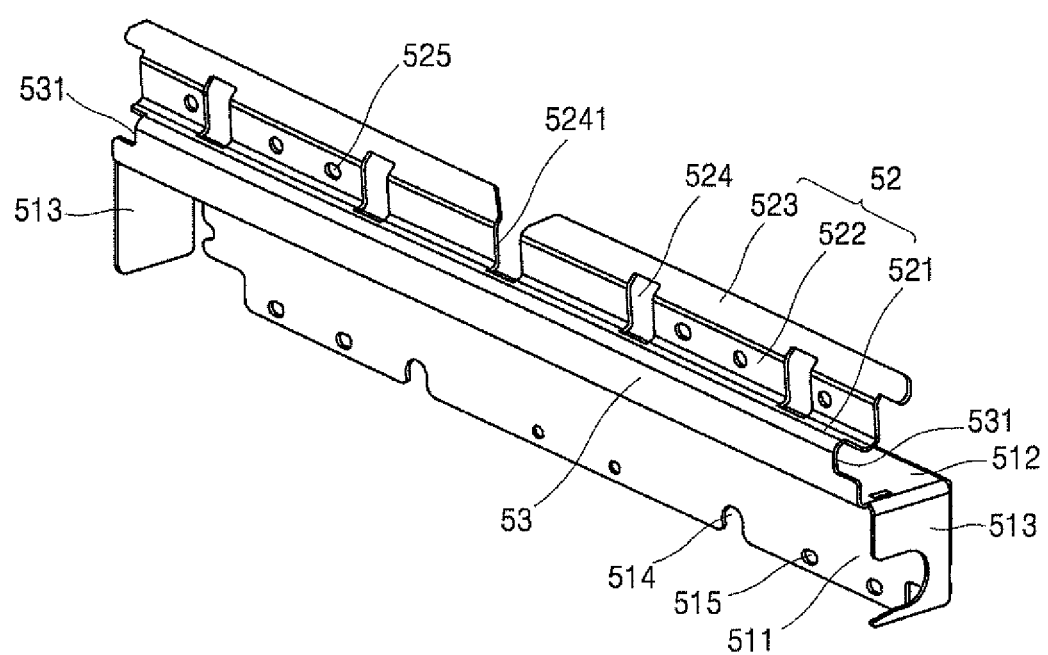

For example, as shown in FIG. 3, when five elongated holes 524 and 5241 are referred to as a first elongated hole, a second elongated hole, a third elongated hole, a fourth elongated hole, and a fifth elongated hole from the left side, five elongated holes may be formed in the side surface supporting member 522 even when an interference structure of the side surface of the second housing 21 presents at positions corresponding to the first elongated hole, the third elongated hole, and the fourth elongated hole. The supporter 5 may be used independently of the left side and the right side, regardless of the fastening hole or the interference structure provided at the side surface of the second oven. It is clear that this principle may be applied not only to stopper 526 but also to the avoiding hole 514, the installation hole 515, the installation hole 525, and cutting portion 531 described below, although not described in detail.

During mounting and fixing of the second oven on the second installation member 52, the lower surface supporting member 521 restricts the vertical position while supporting the load of the second oven, but the side surface supporting member 522 restricts the lateral position without supporting the load of the second oven. Further, when the guide member 523 guides the installation process of the second oven with respect to the second installation member 52, if the guide member 523 is not properly elastically deformed and is so robust, the second oven may be broken or the supporting process of the second oven may be difficult.

Some elongated holes, of the elongated holes, form a cut elongated hole 5241 that has a completely cut form to the upper end of the guide member 523 so that embodiments provide a structure to divide the guide member 523 and the side surface supporting member 522 with proper numbers. Of course, the upper end of the cut elongated hole 5241 is finished in a smooth curved shape.

According to embodiments, the installation position of the second oven 2 with respect to the first oven 1 is restricted by the lower surface supporting member 521 in the vertical direction, and is restricted by the side surface supporting member 522 in the lateral direction. Further, the installation position of the second oven 2 in the forward and rearward direction thereof with respect to the first oven 1 are also restricted by the supporter 5 which is installed at the side of the oven.

Figure 10:
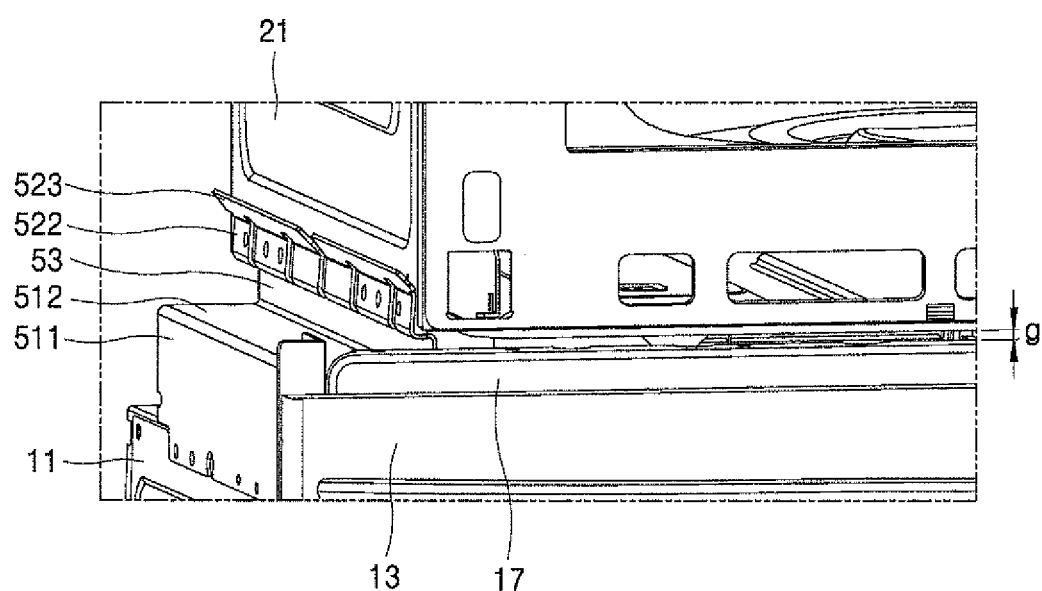
FIG. 10 shows a gap existing between a first oven and a second oven when a second oven from which a second front member is omitted is supported on a supporter.

That is, the supporters 5 are not installed at the front and rear lower portions of the second housing 21. As shown in FIG. 10, it is possible to provide an air flow path g that communicates between the first housing 11 and the second housing 21 in the forward and rearward direction, thereby smoothly cooling various types of components installed above the first housing 11. The installation height of the second oven 2 to provide the air flow path g may be provided by the load supporting member 513 and the connection member 53 described below.

The supporter 5 includes stopper 526 that interferes with the second oven 2 placed on the second installation member 52 and restricts the installation position of the second oven 2 in the forward and rearward direction thereof. The stopper 526 may be provided on the second installation member 52. The front end of the stopper 526 contacts and interferes with the rear surface of the second front member 27, thereby restricting the installation position of the second oven 2 in the forward and rearward direction thereof.

The stopper 526 may be provided at the front of the guide member 523 and may have a form protruding forward from the guide member 523. Then, the stopper may be disposed at a position distant from the side surface of the second housing to some extent, so that it is easy to intuitively and visually determine the installation position of the second oven in the forward and rearward direction thereof during the assembly. The stopper 526 may have a circular arc shape protruding forward or a smooth curved line such as a parabola.

The stopper 526 may also be provided at the rear of the guide member 523 to reduce the number of components and not to distinguish the stoppers according to the lateral installation position.

The second oven 2 may be placed on the second installation member 52 slightly forward a normal position. After the second oven 2 is pushed rearward and interference happens between the stoppers 526 and the rear surface of the second front member 27, the side surface supporting member 522 and the side surface of the second housing 21 may be fastened by the supporter fastening member 54.

To the contrary, when the second oven 2 is placed on the second installation member 52 slightly rearward the normal position, the lower end of the rear surface of the second front member 27 may go down and forward along the curve portion of the stopper 526 by the weight of the second oven 2 and may be supported at the normal position.

A tolerance of about 0.5 mm may be provided between the stopper 526 and the rear surface of the second front member 27, thereby preventing the installation hole 525 of the second installation member 52 from not corresponding to the fastening hole of the side surface of the second housing 21 due to a manufacturing tolerance and the assembly tolerance of components.

The connection member 53 vertically extends to vertically connect the first installation member 51 and the second installation member 52. A lower end of the connection member 53 is bent upward from a second lateral end of the lateral extending member 512 and an upper end of the connection member 53 is bent downward from the second lateral end of the lower surface supporting member 521, so that the connection member 53 vertically extends. The connection member 53 has a vertical plane shape extending in the forward and rearward direction thereof.

As described above, the lateral extending member 512 and the lower surface supporting member 521 have a structure similar to a flange of C-shaped steel and have a structure similar to a web of the C-shaped steel. Therefore, even when a load of the second oven 2 acts on the structure of the C-shaped steel as a distributed load, a middle portion in the forward and rearward direction thereof hardly sags due to high bending rigidity of the structure of the C-shaped steel, and the load of the second oven 2 may be firmly supported through the load supporting member 513 provided at a front end and a rear end of the first installation member 51.

The lower surface supporting member 521 is spaced upward from the lateral extending member 512 by the connection member 53. The lower surface supporting member 521 may be supported from the lateral extending member 512 only by the connection member 53. Then, during stacking of the second oven 2, elasticity is applied to the connection member 53 and the second installation member 52 to some extent based on the first installation member 51 in a circumferential direction of an axis based on an axis extending forward and rearward.

Therefore, an impact may be alleviated to a certain extent even when the second oven is slightly bumped and placed on the second installation member during installation of the second oven. Further, when the guide member 523 is pressed by the second oven 2 and a force is applied to the guide member 523 during assembly, a section deformed by the force is expanded from the second installation member 52 to the connection member 53, thereby preventing deformation from intensively occurring at a particular portion.

Further, the installation height of the second oven with respect to the first oven may be determined based only on the extension length of the connection member 53, so that design and manufacturing of the supporter is more convenient. A gap between the first oven and the second oven may be determined when the installation height of the second oven with respect to the first oven is determined by adjusting the length of the connection member 53. The gap may be utilized as a space for air flow.

Cutting portion 531 that is cut rearward to accommodate the rearward bending portion 171 may be provided at a front end of the connection member 53. Thus, the supporter does not interfere with the rearward bending portion 171 so that the enamel surface of the finishing panel 17 is not damaged, and the second installation member 52 further extends forward as much as possible to further extend a supporting range of the second oven 2.

Further, the cutting portion 531 extends to the lower surface supporting member 521 and functions to reduce resistance to the bending to some extent during the bending process of the connection member 53 and the lower surface supporting member 521. The cutting portion 531 may also be provided at the rear end of the connection member 53. According to embodiments, as the supporters 5 are installed at the right and left sides of the first oven 1, and it is not necessary to distinguish the supporter 5 installed at the left side with the supporter 5 installed at the right side, cutting portions 531 are provided at both ends of the connection member 53, thereby reducing the number of components and enhancing convenience of assembly.

Hereinafter, an assembly process of the two-stage stacked oven using the supporter 5 and an operation of the two-stage stacked oven are described.

As shown in FIG. 1, first oven 1, which may be manufactured as an individual oven product, is prepared. Then, the supporters 5 are installed at both ends of the upper portion of the first oven 1, respectively. First, when the vertical extending member 511 and the load supporting member 513 contact the side surface and the upper surface of the first oven 1, respectively, and the position in the forward and rearward direction thereof is aligned through the avoiding hole 514, the supporter fastening member 52 is installed in the first housing 11 through the installation hole 515 and the supporter 5 is installed on the first housing 11.

Figure 4:
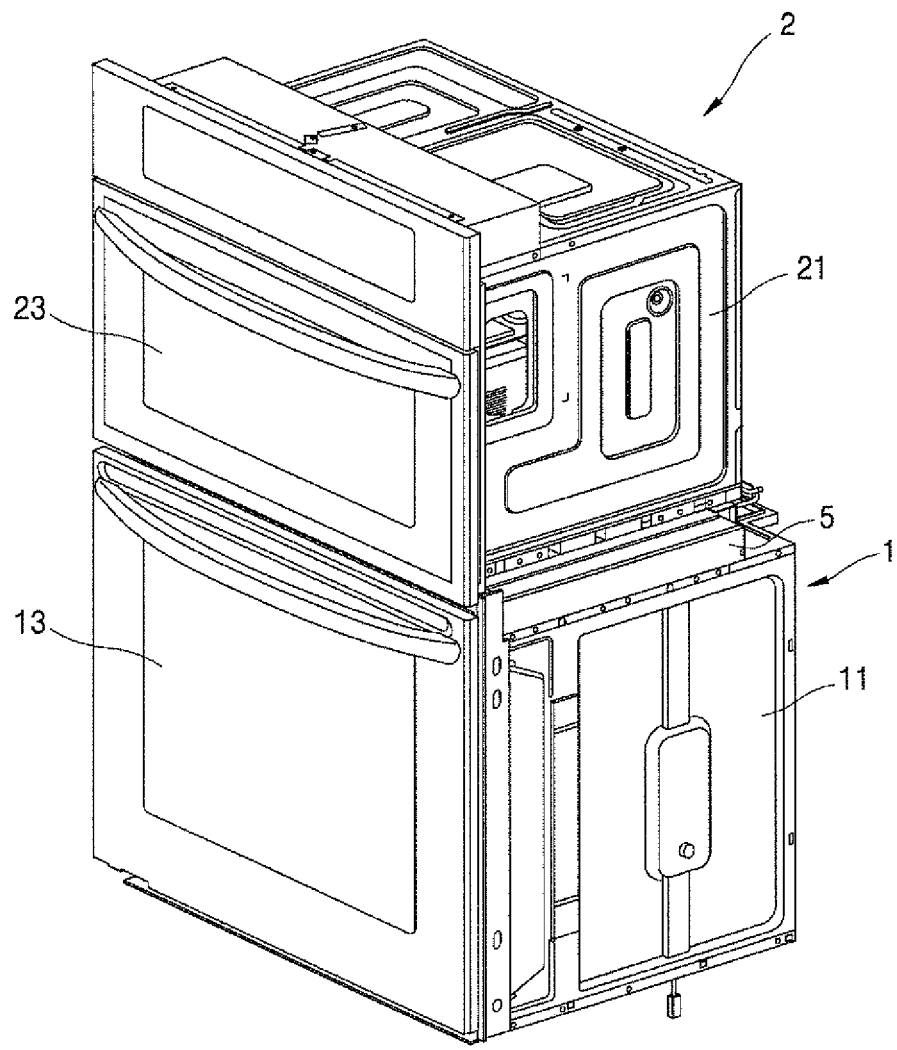
FIG. 4 is a perspective view of a state in which a second oven is stacked above a first oven.
Figure 5:
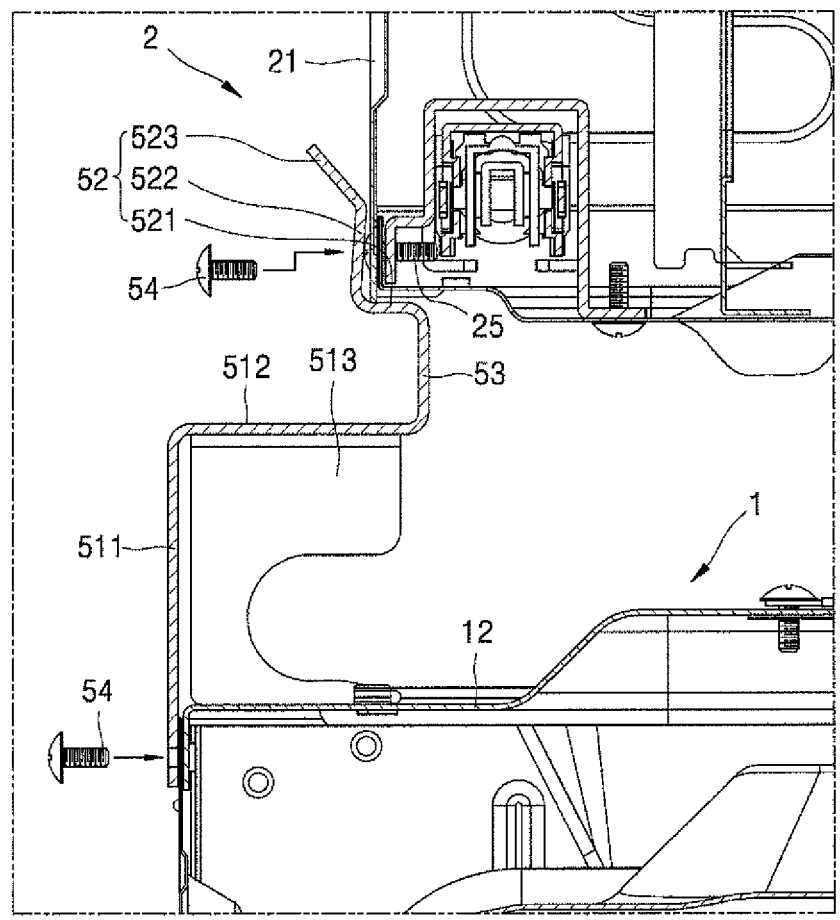
FIG. 5 is a cross-sectional view of a state in which a first oven and a second oven are stacked by a supporter viewed from front.
Figure 6:
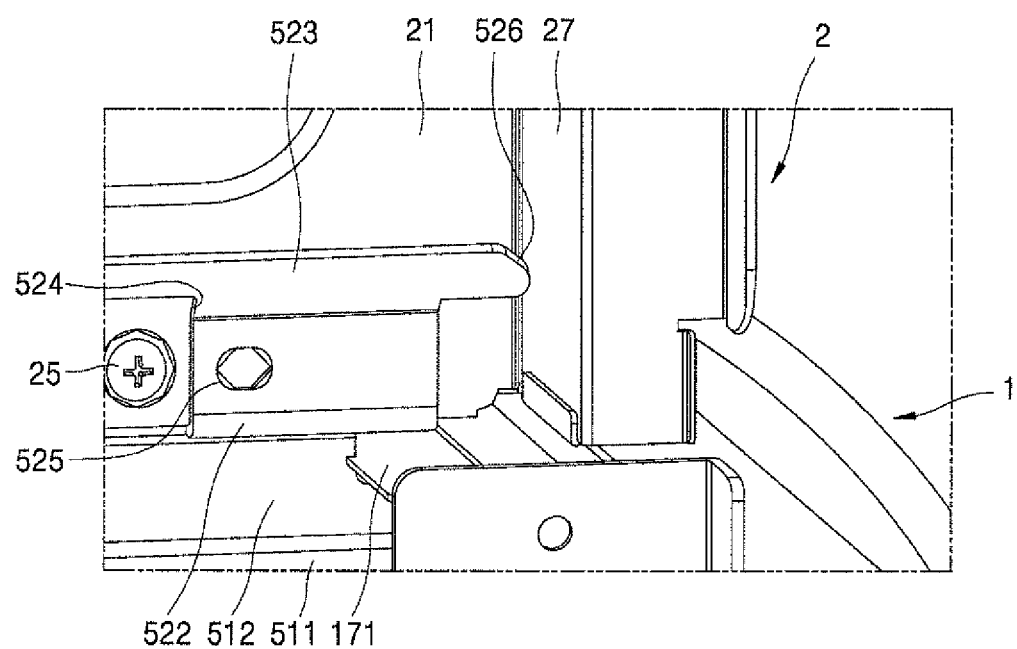
FIG. 6 is a side rear perspective view of a state in which a stopper of a supporter interferes with a second front member of a second oven.
Figure 7:
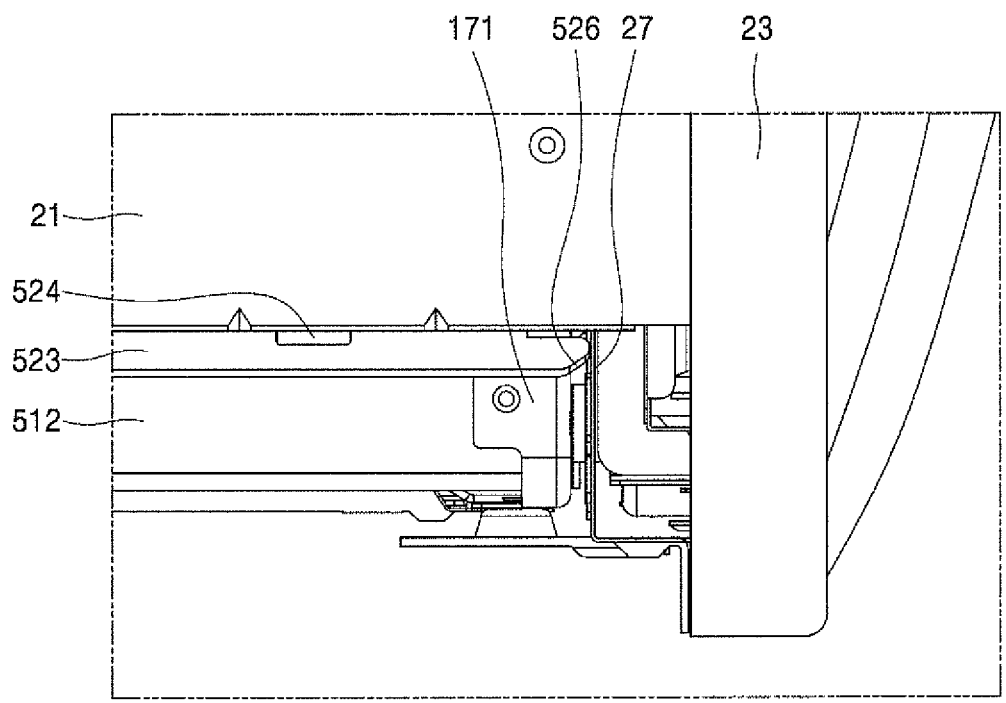
FIG. 7 is a plan view of a state in which a stopper of a supporter interferes with a second front member of a second oven.
Figure 8:
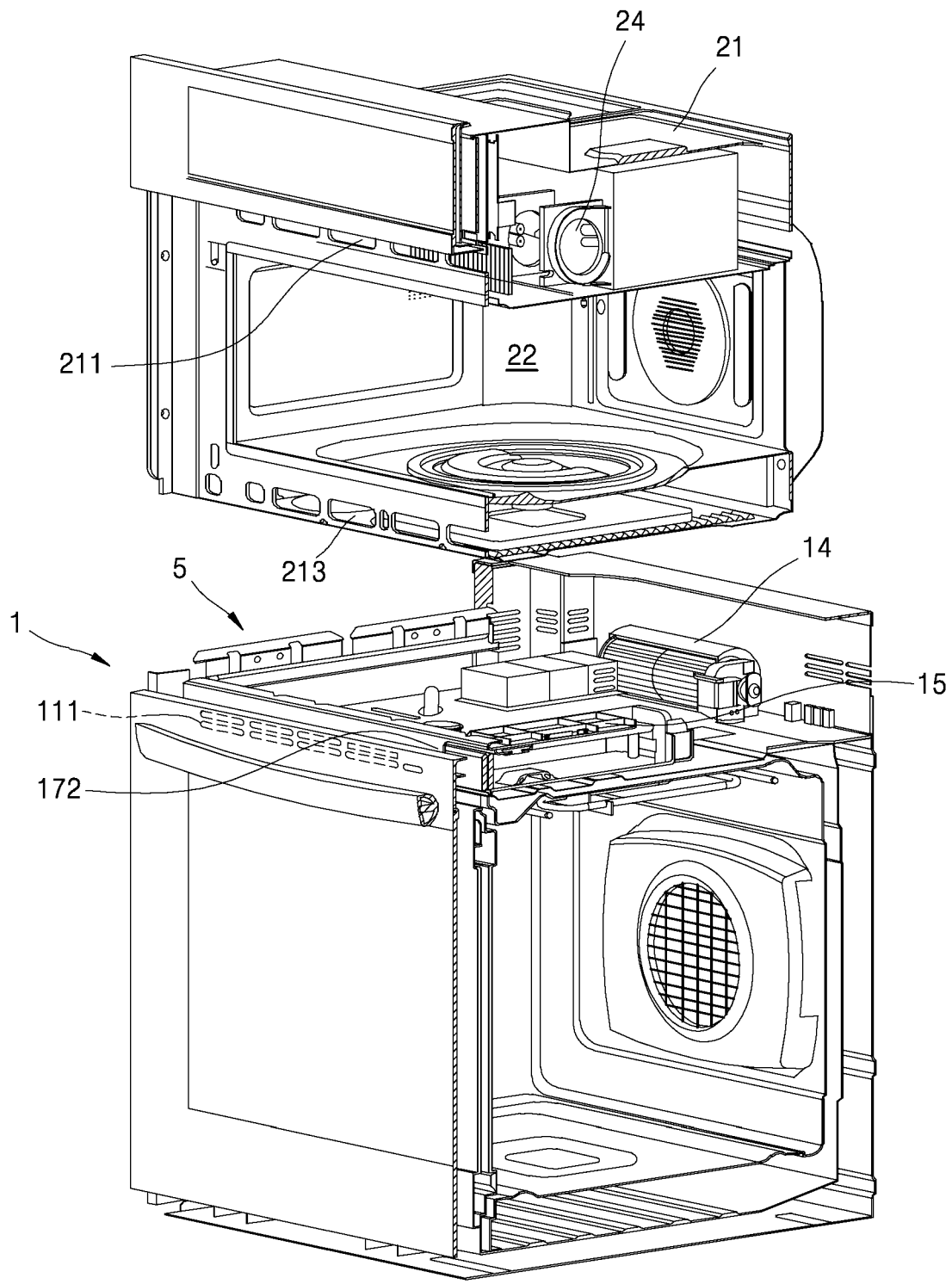
FIGS. 8 and 9 are cross-sectional perspective views of states before and after ovens are stacked, respectively.
Figure 9:
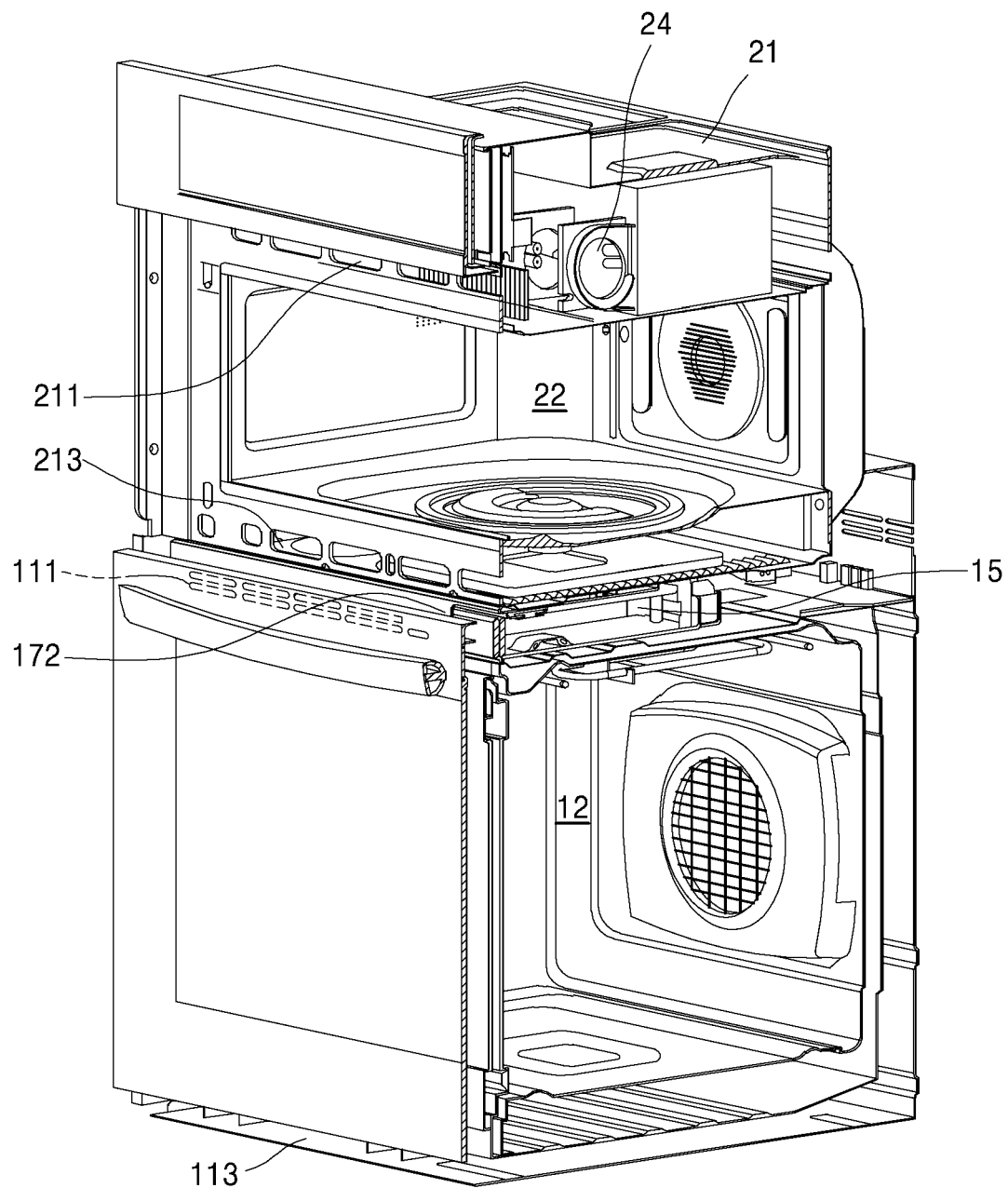

As shown in FIGS. 4 and 5, for example, the second oven 2, which may be manufactured as an individual oven product, is supported on the second installation member 52 of the supporter 5. The insertion position of the second oven 2 in the lateral direction thereof is generally guided and aligned by the guide member 523 and is restricted by the side surface supporting member 522. Further, positions of the second installation member 52 and the second oven are aligned through interference between the stopper 526 and the second front member 27 of the second oven 2. Then, the supporter fastening member 54 is fastened to the second housing 21 through the installation hole 525 to fix the supporter 5 to the second housing 21.

As the two-stage stacked oven may be installed in the built-in manner, as shown in FIG. 4, the two-stage stacked oven may be installed at a site without further covering an additional housing at the side surface and the rear surface of the two ovens 1 and 2 when the two ovens 1 and 2 are stacked. As the two-stage stacked oven is installed in the built-in manner, there is no space to introduce outside air into the oven except for the front side of the product, or to discharge the inside air to the outside.

Accordingly, in embodiments, the air to cool the second oven is introduced through the upper through-hole 211 at the front upper portion of the second oven and is discharged through the lower through-hole 213 at the front lower portion of the second oven using the turbo fan 24 installed above the second cooking chamber of the second oven. Further, the air to cool the first oven is introduced from the lower portion of the first door and is introduced through the air flow path g between the first oven and the second oven as described above and is discharged through the lower through-hole 113 provided at the front lower portion of the first oven using the turbo fan 14 installed rearward the upper portion of the first oven.

Embodiments disclosed herein solve the above-mentioned problem and provide respective oven products or an oven capable of having a two-stage stacked oven with a same oven. Embodiments disclosed herein also provide a structure capable of increasing a size of a cooking chamber, as well as reducing an overall height of the two-stage stacked oven.

Embodiments disclosed herein further provide an oven that may smoothly cool components installed between two stacked ovens. Embodiments disclosed herein also provide an oven capable of providing a space to open and close a door.

According to embodiments disclosed herein, the oven includes first oven 1 and second oven 2 installed above the first oven 1. The first oven 1 and the second oven 2 may be operated using different heating methods from each other. The first oven 1 may include a gas heating system or an electric heating system. To the contrary, the second oven 2 may be a microwave.

The first oven 1 may include first housing 11 that has first cooking chamber 12 opened to a front and first door 13 that is rotatably installed at a front of the first housing 11 and opens and closes the first cooking chamber 12, and finishing panel 17 that is installed at a circumference of an opening of the first cooking chamber 12 at the front of the first housing 11 and faces a rear surface of the first door 13. An outer edge of the finishing panel 17 is bent rearward to form rearward bending portion 171.

The second oven 2 may include second housing 21 that has second cooking chamber 22 opened to the front and second door 23 that is rotatably installed at a front of the second housing 22 and opens and closes the second cooking chamber 22, and second front member 27 that is provided at the front of the second housing 21 and extends outward in a direction of crossing a forward and rearward direction from the second housing 21 to face a rear surface of the second door 23. According to embodiments disclosed herein, the oven includes supporter 5 that is installed between the first oven 1 and the second oven 2 and fixes the second oven 2 at a position spaced upward from the first oven 1.

The supporter 5 includes first installation member 51 that contacts an upper portion of a side surface and an upper surface of the first housing 11 of the first oven 1 and is fixed to the first housing, second installation member 52 that contacts a lower portion of a side surface and a lower surface of the second housing 21 and is fixed to the second housing, and connection member 53 that vertically extends and connects the first installation member 51 and the second installation member 52.

The first installation member 51 includes vertical extending member 511 that contacts the side surface of the first housing 11 and extends vertically; and lateral extending member 512 extending in a second lateral direction (a direction deeper into or toward a center of the oven) from an upper portion of the vertical extending members 511.

The first installation member 51 may include load supporting member 513 that is provided below the lateral extending member 512 and in a space corresponding to the second lateral direction of the vertical extending member 511 and includes a shape included in a plane that crosses both a plane including the vertical extending member 511 and a plane including the lateral extending member 512. The lower end of the load supporting member 513 may contact the upper surface of the first housing 11.

The upper end of the load supporting member 513 may contact the lateral extending member 512. Then, the lateral extending members 512 may be installed at a position corresponding to a predetermined height from the upper surface of the first oven by the load supporting member.

The load supporting member 513 may be bent downward from a front end and a rear end of the lateral extending member 512, respectively. Therefore, even when the second oven 2 is supported on the second installation member 52, sagging of the lateral extending member 512 spaced from the upper surface of the first oven does not occur. When the load supporting member 513 has a structure in which the load supporting member 513 is bent in the second lateral direction from the vertical extending members 511, assembly tolerance in an installation height of the second oven 2 may be accumulated by a gap existing between the load supporting member 513 and the lateral extending member 512.

The second installation member 52 may include lower surface supporting member 521 that contacts the lower surface of the second housing 21 and supports the lower surface of the second housing 21, and side surface supporting member 522 that contacts the lower portion of the side surface of the second housing 21 to support the side surface of the second housing 21. The second installation member 52 may further include guide member 523 that extends upward from an upper end of the side surface supporting member 522 in a direction away from the side surface of the second housing 21.

The side surface supporting member 522 is bent upward from an end in a first lateral direction (a direction away from a center of the oven) of the lower surface supporting member 521 and extends upward and the side surface supporting member 522 has an acute angle with the lower surface supporting member 521. The bending portion may not contact a corner at which a side surface and a lower surface of the second housing 21 meet and the upper portion of the side surface supporting member 522 may contact the side surface of the second housing 21. The guide member 523 is also bent from the upper end of the side surface supporting member 522.

During assembly of the second housing, second housing fastening member 25, such as a bolt or a screw, may be fastened to the side surface of the second housing. Therefore, a head of the second housing fastening member 25 may protrude from the side surface of the second housing 21.

The side surface supporting member 522 may include elongated hole 524 that accommodates the second housing fastening member 25 protruding laterally from the side surface of the second housing 21. The elongated hole 524 may be formed vertically. The second housing fastening member 25 and the side surface supporting member 522 may be prevented from interfering with each other by the elongated hole 524 and alignment of the second oven 2 may be accurately performed.

The elongated hole 524 may extend further from the side surface supporting member 522 to a portion of the guide member 523 and/or a portion of the lower surface supporting member 521. Thus, the elongated hole 524 may prevent interference and may reduce resistance to bending generated during bending and forming of the second installation member 52.

Installation hole 525 into which the supporter fastening member 54 fastened to the side surface of the second housing 21 is inserted may be formed in the side surface supporting member 522. The supporter fastening member 54 may be a screw or a bolt. The side surface of the second housing 21 may include a fastening hole (not shown) at a position corresponding to the installation hole 525.

According to embodiments disclosed herein, the installation position of the second oven 2 with respect to the first oven 1 is restricted by the lower surface supporting member 521 in the vertical direction thereof, and is restricted by the side surface supporting members 522 in the lateral direction thereof. The installation position of the second oven 2, in the forward and rearward direction thereof, with respect to the first oven 1 may also be restricted by the supporter 5. That is, supporters may not be installed in the front and rear lower portions of the second housing 21. As a result, it is possible to provide an air flow path communicating between the first housing 11 and the second housing 21 in the forward and rearward direction thereof, thereby smoothly cooling various types of components installed above the first housing 11.

The supporter 5 includes stopper 526 that interferes with the second oven 2 placed on the second installation member 52 to restrict the installation position of the second oven 2 in the forward and rearward direction thereof. The stopper 526 may be provided on the second installation member 52. A front end of the stopper 526 contacts and interferes with the rear surface of the second front member 27 so that the stopper 526 restricts the installation position of the second oven 23 in the forward and rearward direction thereof.

The stopper 526 may be provided at the front of the guide member 523 and may have a form protruding forward from the guide member 523. The stopper may be disposed at a position spaced apart from the side surface of the second housing to some extent, so that it is easy to intuitively and visually identify the installation position of the second oven, in the forward and rearward direction thereof, during assembly.

The connection member 53 vertically extends. A lower end of the connection member 53 may be connected to the second lateral end of the lateral extending member 512 and an upper end of the connection member 53 may be connected to the second lateral end of the lower surface supporting member 521. The connection member 53 may be bent upward from the second lateral end of the lateral extending member 512 and may be bent downward from the second lateral end of the lower surface supporting member 521.

The connection member 53 may have a vertical plane shape extending in the forward and rearward direction thereof. The lower surface supporting member 521 may be spaced upward from the lateral extending member 512 by the connection member 53.

The lower surface supporting member 521 may be supported from the lateral extending member 512 only by the connection member 53. Elasticity is applied to the supporter during stacking of the second oven 2 to some extent, thereby facilitating installation of the second oven. Further, when the guide member 523 is pressed by the second oven 2 during assembly and receives a force, a section deformed by the force is expanded from the second installation member 52 to the connection member 53, thereby preventing deformation from intensively occurring at any particular portion.

Further, as the installation height of the second oven with respect to the first oven may be determined solely based only on an extension height of the connection member, design and manufacturing of the supporter are more convenient.

The connection member 53 may include cutting portion 531 cut rearward to accommodate the rearward bending portion 171, at the front end thereof. Thus, the supporter does not interfere with the rearward bending portion 171 so that an enamel surface of the finishing panel 17 is not damaged, and the second installation member 52 extends further forward as much as possible to provide a supporting range of the second oven 2.

The cutting portion 531 extends to the lower surface supporting member 521 and functions to reduce resistance to the bending to some extent during bending of the connection member 53 and the lower surface supporting member 521.

According to embodiments disclosed herein, in the oven, only the upper end of the side surface of the first housing of the first oven and the lower end of the side surface the second housing of the second oven are involved in a stacked structure, so that the first oven and the second oven are provided as respective oven products, and a two-stage stacked oven may be provided by stacking a first oven and a second oven, which are provided as respective oven products.

Further, according to embodiments disclosed herein, in the oven, as mutual stacking and fixing are performed at the sides of the first oven and the second oven, a space between the two ovens may be opened in the forward and rearward direction thereof. Accordingly, even when the space between the two ovens is narrow, smooth airflow is induced and components disposed in the space may be cooled smoothly. Accordingly, a height of the space between the two ovens may be minimized, and the overall height of the two-stage stacked oven may be reduced, thereby further providing a volume of the cooking chamber.

Further, according to embodiments disclosed herein, as the sides of the first oven and the second oven are mutually fixed, a space in the lower front portion of the second oven may be easily provided. Even when a pull-down type door is used for the second oven, there is no problem in opening and closing of the door.

As described above, while the present disclosure has been described with reference to exemplary drawings thereof, it is to be understood that the disclosure is not limited by the exemplary embodiments and the drawings disclosed in the present disclosure, and it is clear that many variations can be made by a person skilled in the art within the range of the technical idea of the present disclosure. In addition, although working effects obtained based on the configuration of the preset invention is not explained by explicitly describing it while explaining the above embodiments of the present disclosure hereinabove, it is needless to say that effects which are predictable by the corresponding configuration has to be also recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An oven assembly comprising a first oven installed at a lower portion of the oven assembly, a second oven disposed at an upper portion of the first oven; and a supporter installed between the lower oven and the upper oven to fix the lower oven to the upper oven, the supporter comprising:
   a first installation member that contacts an upper portion of a side surface and an upper surface of a first housing of the first oven and is fixed to the first housing;
   a second installation member that contacts a lower portion of a side surface and a lower surface of a second housing of the second oven and is fixed to the second housing;
   a connection member that extends vertically so that the first installation member and the second installation member are spaced apart from each other in a vertical direction and connects the first installation member and the second installation member, wherein the first installation member comprises:
      a vertical extending member that contacts a side surface of the first housing and extends vertically, and extends further upward than an upper surface of the first housing;
      a lateral extending member bent and extending in a lateral direction which is an opposite direction to a direction away from a center of the oven from an upper end of the vertical extending member, and spaced apart upward from the upper surface of the first housing; and
      a load supporting member that extends downward from the lateral extending member, a lower portion of which is supported by the upper surface of the first housing.

2. The oven assembly of claim 1, wherein the connection member is bent from the second installation member and extends downward, wherein the connection member has a vertical plane extending in a forward and rearward direction, wherein a lower portion of the connection member is connected to the first installation member, and wherein a lower surface support is spaced upward from the first installation member by the connection member.

3. The oven assembly of claim 1, wherein the first oven comprises a first door at a front, wherein a finishing panel that faces an upper portion of a rear surface of the first door is installed at a front upper portion of the first oven, wherein an upper end of the finishing panel is bent rearward to form a rearward bending portion, and wherein a cutting portion cut rearward to accommodate the rearward bending portion is provided at a front end of the connection member.

4. The oven assembly of claim 1, wherein the second installation member comprises:
   a side surface support that contacts the lower portion of the side surface of the second housing and supports a side surface of the second housing; and
   a lower surface support that contacts the lower surface of the second housing and supports the lower surface of the second housing, wherein the side surface support is bent upward from a first lateral end of the lower surface support and extends upward and the side surface support has an acute angle with the lower surface support so that the bending portion does not contact a corner in which the side surface and the lower surface of the second housing meet and an upper portion of the side surface support contacts the side surface of the second housing.

5. The oven assembly of claim 4, wherein the side support has a long hole vertically formed to accommodate a second housing fastener protruding more laterally than the side surface of the second housing, wherein the long hole further extends from the side surface support member to a portion of a guide that extends from the upper end of the side surface support and/or to a portion of the lower surface support.

6. The oven assembly of claim 1, wherein the second installation member comprises:
   a side surface support that contacts the lower portion of the side surface of the second housing and supports a side surface of the second housing; and
   a lower surface support that contacts the lower surface of the second housing and supports the lower surface of the second housing, wherein the second installation member further comprises a guide bent from an upper end of the side surface support to extend upward in a direction away from the side surface of the second housing.

7. The oven assembly of claim 1, wherein a stopper is provided at a front of the second installation member, wherein the stopper interferes with the second oven placed on the second installation member and restricts an installation position of the second oven in a forward and rearward direction.

8. The oven assembly of claim 7, wherein a second front member that extends laterally outward from the second housing and faces a rear surface of the second door is provided at a front of the second oven, and wherein a front end of the stopper contacts and interferes with a rear surface of the second front member and restricts the installation position of the second oven in the forward and rearward direction.

9. The oven assembly of claim 1, wherein load supporting member is provided below the lateral extending member and in a space corresponding to the lateral direction of the vertically extending member and comprises a shape comprised in a plane that crosses both a plane comprising the vertically extending member and a plane comprising the lateral extending member, and an upper end of which contacts the lateral extending member.

10. The oven assembly of claim 9, wherein the load supporting member is bent downward from a front end and a rear end of the lateral extending member, respectively, and wherein a lower end of the load supporting member contacts the upper surface of the first housing.

11. The oven assembly of claim 1, wherein the first oven comprises:
the first housing having a first cooking chamber opened at a front;
a first door rotatably installed at the front of the first housing and configured to open and close the first cooking chamber; and
a finishing panel installed at a circumference of an opening of the first cooking chamber at the front of the first housing and facing a rear surface of the first door, wherein the second oven comprises:
the second housing having a second cooking chamber opened at a front; and
a second door rotatably installed at the front of the second housing and configured to open and close the second cooking chamber, wherein a height of the lower surface support of the second installation member is greater than a height of an upper end of the finishing panel, and wherein an opening is provided between a lower surface of the second housing placed on the lower surface support and the upper end of the finishing panel.

12. A supporter configured to be installed between a first oven and a second oven which are stacked in a vertical direction to fix the first oven to the second oven, the supporter comprising:
a first installation member configured to contact an upper portion of a side surface and an upper surface of a first housing of the first oven and be fixed to the first housing;
a second installation member configured to contact a lower portion of a side surface and a lower surface of a second housing of the second oven and be fixed to the second housing;
a connection member that extends vertically so that the first installation member and the second installation member are spaced apart from each other in the vertical direction thereof and connects the first installation member and the second installation member, wherein the first installation member comprises:
a vertical extending member that contacts a side surface of the first housing and extends vertically, and extends further upward than an upper surface of the first housing;
a lateral extending member bent and extending in a lateral direction which is an opposite direction to a direction away from a center of the oven from an upper end of the vertical extending member, and spaced apart upward from the upper surface of the first housing; and
a load supporting member that extends downward from the lateral extending member, a lower portion of which is supported by the upper surface of the first housing.

13. The supporter of claim 12, wherein the connection member is bent from the second installation member and extends in a downward direction, wherein the connection member has a vertical plane form extending in a forward and rearward direction, wherein a lower portion of the connection member is connected to the first installation member, and wherein the lower surface support is spaced upward from the first installation member by the connection member.

14. The supporter of claim 12, wherein the second installation member comprises:
a side surface support configured to contact the lower portion of the side surface of the second housing and support the side surface of the second housing; and
a lower surface support configured to contact the lower surface of the second housing and support the lower surface of the second housing, wherein the connection member is bent from a second lateral end of the lower surface support and extends downward.

15. The supporter of claim 13, wherein the second installation member further comprises a guide bent from an upper end of the side surface support to extend upward in a direction away from the side surface of the second housing.

16. An oven assembly comprising the first oven, the second oven, and the supporter of claim 12 disposed therebetween.

17. A pair of brackets configured to be installed at lateral sides between a first oven and a second oven which are stacked in a vertical direction to fix the first oven to the second oven and leave an airflow path therebetween, the pair of brackets each comprising:
a first portion that extends in a foreward-rearward direction and configured to contact an upper portion of a side surface and an upper surface of a first housing of the first oven and be fixed to the first housing;
a second portion that extends in the foreward-rearward direction and configured to contact a lower portion of a side surface and a lower surface of a second housing of the second oven and be fixed to the second housing;
a connection portion that extends vertically so that the first portion and the second portion are spaced apart from each other in the vertical direction thereof and connects the first portion and the second portion, wherein the first portion comprising:
a vertical extending member that contacts a side surface of the first housing and extends vertically, and extends further upward than an upper surface of the first housing;
a lateral extending member bent and extending in a lateral direction which is an opposite direction to a direction away from a center of the oven from an upper end of the vertically extending member, and spaced apart upward from the upper surface of the first housing; and
a load supporting member that extends downward from the lateral extending member, a lower portion of which is supported by the upper surface of the first housing.

18. The supporter of claim 17, wherein the connection portion is bent from the second portion and extends in a downward direction, wherein a lower portion of the connection portion is connected to the first portion, and wherein a lower surface support is spaced upward from the first portion by the connection portion.

19. An oven assembly comprising the first oven, the second oven, and the pair of brackets of claim 17 disposed therebetween.

* * * * *